United States Patent
Dutsky et al.

(10) Patent No.: US 9,545,948 B2
(45) Date of Patent: Jan. 17, 2017

(54) HYDRAULICALLY ASSISTED POWER STEERING SYSTEM

(71) Applicant: STEERING SOLUTIONS IP HOLDING CORPORATION, Saginaw, MI (US)

(72) Inventors: Jason A. Dutsky, Bay City, MI (US); Joel E. Birsching, Vassar, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 14/699,450

(22) Filed: Apr. 29, 2015

(65) Prior Publication Data
US 2016/0318547 A1    Nov. 3, 2016

(51) Int. Cl.
*B62D 5/06* (2006.01)
*B62D 5/083* (2006.01)
*B62D 5/065* (2006.01)

(52) U.S. Cl.
CPC ............ *B62D 5/064* (2013.01); *B62D 5/065* (2013.01); *B62D 5/083* (2013.01)

(58) Field of Classification Search
CPC .......... B62D 5/064; B62D 5/083; B62D 5/065
See application file for complete search history.

(56) References Cited

U.S. PATENT DOCUMENTS

| | | | | |
|---|---|---|---|---|
| 5,357,845 A * | 10/1994 | Sangret | ..................... | B62D 6/02 180/441 |
| 5,505,275 A * | 4/1996 | Phillips | ..................... | B62D 5/06 180/417 |
| 5,682,745 A * | 11/1997 | Phillips | ..................... | B62D 5/06 60/431 |
| 6,318,495 B1 * | 11/2001 | Obata | ..................... | B62D 5/065 180/422 |
| 7,225,894 B2 * | 6/2007 | Broughton | ............. | B62D 5/063 180/417 |
| 8,392,067 B2 * | 3/2013 | Yamamoto | ............. | B62D 5/065 701/41 |
| 8,833,506 B2 * | 9/2014 | Sunaga | ..................... | B62D 5/06 180/406 |
| 2008/0277187 A1 * | 11/2008 | Williams | ............... | B62D 5/063 180/422 |
| 2015/0298728 A1 * | 10/2015 | Yoda | ........................ | H02K 7/06 180/422 |

* cited by examiner

Primary Examiner — Kevin Hurley
(74) Attorney, Agent, or Firm — Cantor Colburn LLP

(57) ABSTRACT

A power steering assist system includes a hydraulic assist power steering assembly configured to couple to a vehicle steering gear, and a hydraulic pump having an electric motor, the hydraulic pump configured to supply pressurized hydraulic fluid to the hydraulic assist power steering assembly.

16 Claims, 3 Drawing Sheets

HYDRAULICALLY ASSISTED POWER STEERING SYSTEM

FIELD OF THE INVENTION

The following description relates to a vehicle steering assist system, and more particularly, to a hydraulic steering assist system having an electrically powered hydraulic pump.

BACKGROUND OF THE INVENTION

In some vehicles, power steering systems are designed to provide hydraulic assist to enable a driver to complete a turn of the vehicle. Some known hydraulic steering systems use a recirculating ball style steering gear or a rack and pinion style steering gear, each of which may not have the capability to perform functions such as park assist, lane keeping, lead and pull compensation, drive alert, active return-to-center, active dampening, or stability control assist. In order to provide such additional performance features, a system such as a hydraulic variable effort steering system is typically required.

Some hydraulic steering systems utilize a power steering pump to provide pressurized hydraulic fluid to the steering gear. However, known systems power the power steering pump with a vehicle engine, which consumes vehicle power and fuel. Additionally, the fluid flow rate of the pump is a direct function of engine speed. For example, engine speed is typically low during a parking maneuver and high during highway driving, which results in low fluid flow rates during parking and high flow rates during highway driving. As such, the hydraulic power steering systems with torque overlay capability may be unable to provide park assist or other performance features.

SUMMARY OF THE INVENTION

In one aspect of the invention, power steering assist system is provided. The system includes a hydraulic assist power steering assembly configured to couple to a vehicle steering gear, and a hydraulic pump having an electric motor, the hydraulic pump configured to supply pressurized hydraulic fluid to the hydraulic assist power steering assembly.

In another aspect of the invention, a vehicle is provided. The vehicle includes a steering gear operably coupled at least one road wheel, and a hydraulic assist power steering system. The hydraulic assist power steering system includes a hydraulic assist power steering assembly coupled to the steering gear, and a hydraulic pump having an electric motor. The hydraulic pump is configured to supply pressurized hydraulic fluid to the hydraulic assist power steering assembly.

In yet another aspect of the invention, a method of operating a hydraulic assist power steering system comprising a hydraulic assist power steering assembly configured to couple to a vehicle steering gear, and a hydraulic pump having an electric motor, the hydraulic pump configured to supply pressurized hydraulic fluid to the hydraulic assist power steering assembly is provided. The method includes monitoring a vehicle to determine if a condition exists where a hydraulic assist maneuver may be performed, operating the electric hydraulic pump at a low speed if the condition does not exist where the hydraulic assist maneuver may be performed, to supply pressurized hydraulic fluid to the hydraulic assist power steering assembly at a low flow rate, and operating the electric hydraulic pump at a high speed if the condition exists where the hydraulic assist maneuver may be performed, to supply the pressurized hydraulic fluid to the hydraulic assist power steering assembly at a high flow rate.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
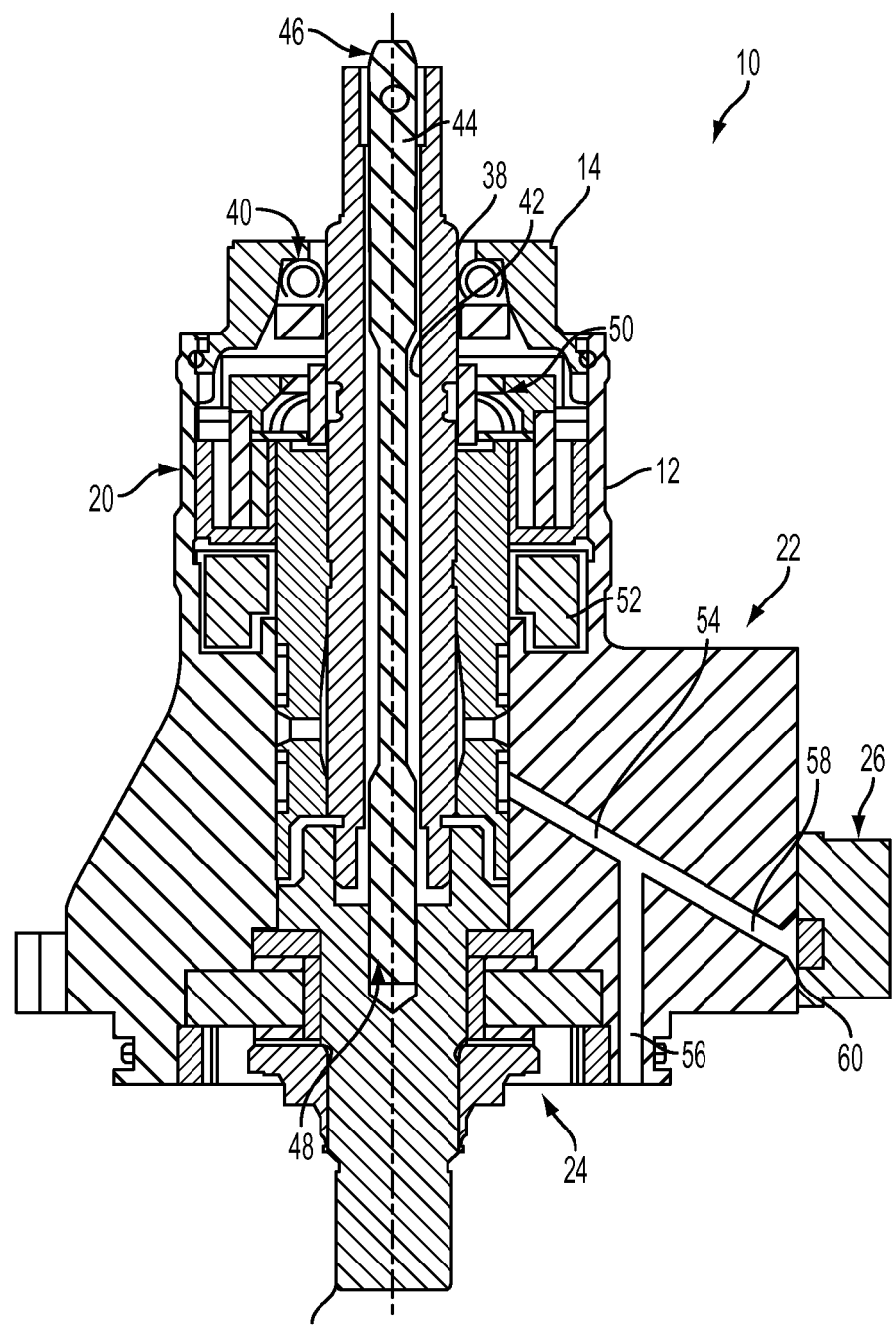
FIG. 1 is a cross-sectional view of an exemplary hydraulic assist power steering assembly.

Referring now to the Figures, where the invention will be described with reference to specific embodiments, without limiting same, an exemplary embodiment of an electronic hydraulic-assist power-steering assembly 10 for a vehicle is illustrated in FIG. 1. Assembly 10 generally includes a valve housing 12 and associated cover 14 that generally house a magnetic actuator assembly 20, a hydraulic rotary valve assembly 22, a bearing assembly 24, a differential pressure transmitter or transducer 26, and a steering gear coupler 28. Alternatively, assembly 10 may include a steering worm integrated therein instead of coupler 28.

In the exemplary embodiment, assembly 10 includes an input shaft 38 rotatably supported by a bearing 40. Input shaft 38 includes a bore 42 to receive a torsion bar 44 having a first end 46 and a second end 48. Torsion bar first end 46 is coupled to a steering wheel (not shown) of a vehicle for rotation in a conventional manner, and second end 48 is coupled to coupler 28, which is configured for coupling to an existing steering gear (not shown).

Magnetic actuator assembly 20 includes a permanent magnet and retainer assembly 50, which is coupled to shaft 38, and a coil 52 to produce a magnetic flux. The magnetic flux causes permanent magnet assembly 50 to rotate and produce a torque on shaft 38, which varies the effective centering torque of torsion bar 44 to change the level of steering assist (i.e., steering assist boost pressure), achieved for a given manual steering input applied at the steering wheel of the vehicle.

In the exemplary embodiment, hydraulic rotary valve assembly 22 is configured to provide hydraulic assistance to the steering operation of the vehicle. Hydraulic rotary valve assembly 22 includes ports 54, 56, and 58, and a seal 60.

In the exemplary embodiment, bearing assembly 24 is configured to support rotational movement of steering gear coupler 28. The assist generated in assembly 10 is determined by the amount of relative angular displacement between shaft 38 and the valve body, which is pinned to and rotates with coupler 28. The torque required to actuate the valve is a result of the twist in torsion bar 46 which occurs when a relative angular displacement is produced between the valve body/coupler 28 and input shaft 46. A polepiece is also pressed onto the valve body such that it rotates with the valve body/coupler 28. The relative angular displacement between the valve body/coupler 28 and input shaft 46 also results in the same angular displacement between the pole piece and permanent magnet assembly 50. When coil 52 is energized, the pole piece acts as an electromagnet which interacts with permanent magnet assembly 50 to produce either a restoring torque in valve assembly 10, or a torque to actuate valve assembly 10.

In the exemplary embodiment, differential pressure transducer 26 is coupled to housing 12 proximate hydraulic rotary valve assembly 22. Differential pressure transducer 26 converts pressure into an electrical signal. One exemplary type of pressure transducer is a strain-gage based transducer, where the conversion of pressure into an electrical signal is achieved by the physical deformation of a strain gage or gages bonded into the diaphragm of the pressure transducer. The diaphragm may help protect the sensor element, such as the strain gage, from the fluid that is being measured. A strain gage is a resistive element whose resistance changes with the amount of strain placed on it. Pressure applied to the transducer may produce a deflection of the diaphragm that introduces strain to the gages, which produces an electrical resistance change proportional to the pressure.

Figure 2:
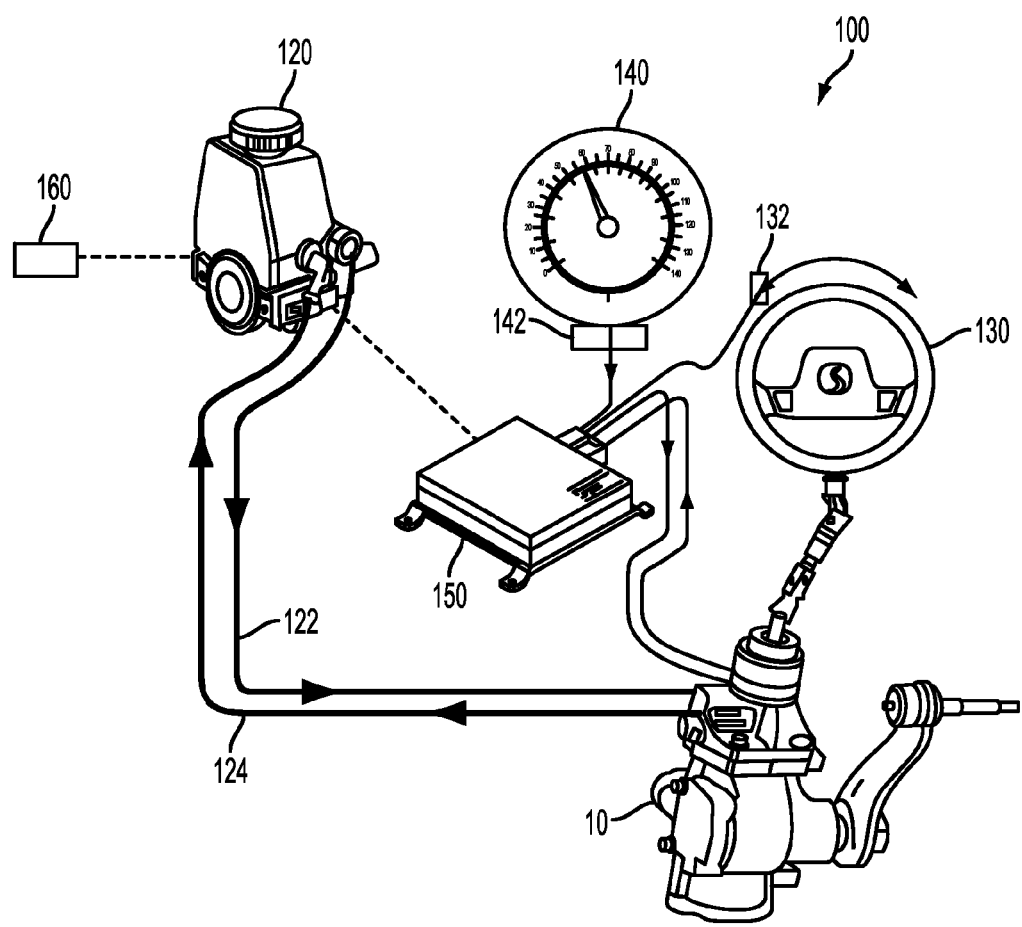
FIG. 2 is a schematic view of an exemplary hydraulic assist power steering system that may use the assembly shown in FIG. 1.

FIG. 2 illustrates an electric hydraulic power steering system 100 that generally includes power steering assembly 10, an electrically powered hydraulic pump 120, a vehicle steering wheel 130, and a vehicle speedometer 140, and a controller 150.

Electrically powered hydraulic pump 120 is fluidly coupled to assembly 10 by a pressure supply conduit 122 and a return conduit 124. Pump 120 includes an electric motor (not shown), which reduces power and fuel consumption compared to a conventional vehicle-engine driven pump (e.g., a pump connected to and driven by a vehicle engine crankshaft). As such, the electric motor enables a speed of pump 120 to be controlled independently of the speed of the vehicle's engine. This enables hydraulic valve assembly 22 to be tuned for a predetermined flow rate, such as a low flow rate or a high flow rate, to assist in performing a desired operation or maneuver of system 100 (e.g., park assist).

For example, at highway speeds when the vehicle's engine speed is high, electrically driven pump 120 can be operated at a low speed and provide a low fluid flow rate to assembly 10. The lower flow rate results in low power usage when a hydraulic assist maneuver is not needed. In the same way, during a static parking maneuver when the vehicle's engine speed is low, electrically driven pump 120 can be operated at a high speed to provide a higher flow rate of hydraulic fluid to assembly 10. The higher flow rate provides a lower steering effort for the driver, which assists with the maneuver. With additional torque provided by magnetic actuator assembly 20, assembly 10 may provide full hydraulic assist to the steering gear, which enables system 100 to be capable of providing park assist or other features described herein.

In the exemplary embodiment, electrically powered hydraulic pump 120 includes a fluid reservoir (not shown) to hold excess hydraulic fluid of the system. In one embodiment, hydraulic pump 120 includes a pump rotor (not shown) directly connected onto a shaft of the electric motor. In another embodiment, hydraulic pump 120 includes a separate pump and electric motor connected with a coupling or shaft (not shown). However, hydraulic pump 120 may have any suitable structure that enables pump 120 to function as described herein. In one embodiment, hydraulic pump 120 is electrically coupled to and receives power from an electrical power source 160 such as a vehicle battery. However, hydraulic pump 120 may be powered by any electrical power source 160 that enables system 100 to function as described herein.

In the exemplary embodiment, vehicle steering wheel 130 is operably connected to a steering wheel angle and velocity sensor 132, which is in signal communication with vehicle controller 150. Angle and velocity sensor 132 is configured to determine a steering angle and angular turning velocity of steering wheel 130 and to provide a signal indicative thereof to controller 150.

In the exemplary embodiment, vehicle speedometer 140 is operably connected to a vehicle speed sensor 142, which is in signal communication with vehicle controller 150. Speed sensor 142 is configured to determine a speed of the vehicle and to provide a signal indicative thereof to controller 150.

Controller 150 is in signal communication with steering wheel angle and velocity sensor 132 and vehicle speed sensor 142 to receive respective steering angle/velocity signals and vehicle speed signals or other signals (e.g., pressure signals from a pressure sensor). Based on the steering angle/velocity signals and the vehicle speed signals, controller 150 selectively controls the speed of hydraulic pump 120. For example, when controller 150 receives signals indicating that the vehicle is in a condition where a hydraulic steering assist maneuver (e.g., park assist) may be performed or initiated, controller 150 increases the speed of hydraulic pump 120 to increase the fluid flow and/or fluid pressure supplied to assembly 10.

In one embodiment, controller 150 controls the speed of hydraulic pump 120 as a function of steering wheel velocity and vehicle speed. When controller 150 receives signals indicating a low steering wheel velocity and a high vehicle speed, which may indicate the vehicle is traveling on a highway, controller 150 controls hydraulic pump 120 to lower the speed of the pump to reduce power usage and pump wear. Conversely, when controller 150 receives signals indicating a high steering wheel velocity and a low vehicle speed, which may indicate the vehicle is performing a parking maneuver, controller 150 controls hydraulic pump 120 to increase the speed of the pump to provide hydraulic fluid at a flow and pressure sufficient to perform the maneuver. Additionally, a driver may request (e.g., voice command, by pressing a button) to direct the vehicle to perform a maneuver (e.g., self-parking). When controller 150 detects the request, controller 150 controls hydraulic pump 120 to increase the speed of the pump to provide hydraulic fluid at a flow and pressure sufficient to perform the maneuver. Controller 150 also provides current to the magnetic actuator assembly 20 to facilitate providing torque for the requested parking maneuver.

Figure 3:
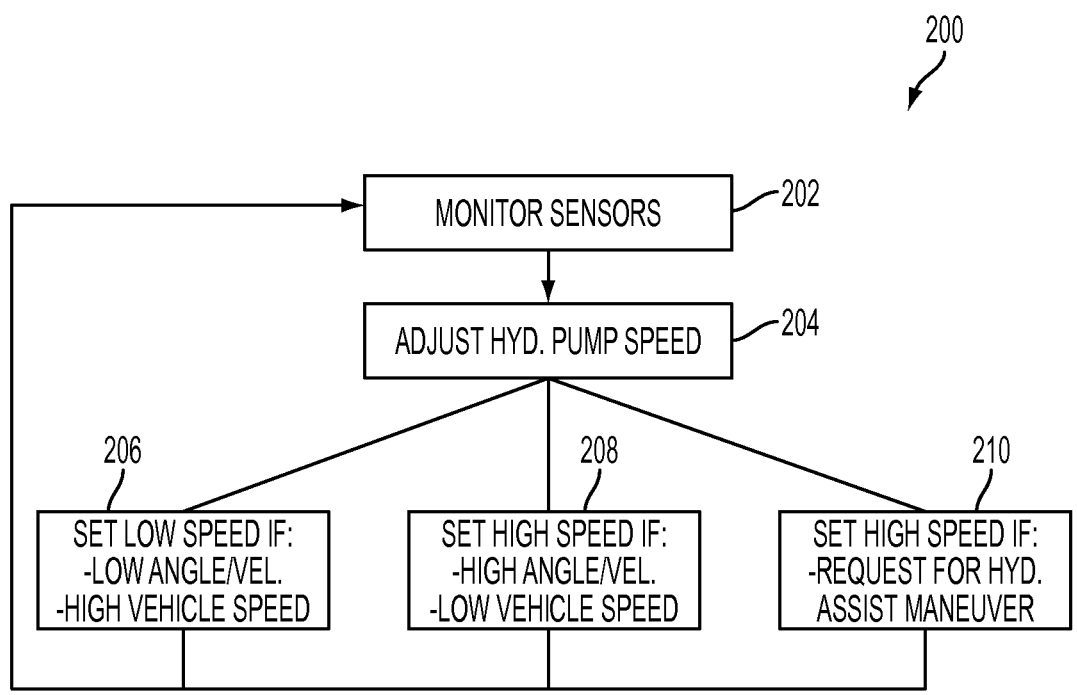
FIG. 3 is a flow chart of an exemplary method of controlling the system shown in FIG. 2.

FIG. 3 illustrates a method 200 of controlling electric hydraulic power steering system 100. At step 202 controller 150 monitors steering wheel angle and velocity signals from sensor 132 and vehicle speed signals from sensor 142. At step 204, controller 150 adjusts a speed of hydraulic pump 120 based on the signals from sensors 132, 142, and may also control current to magnetic actuator assembly 20. More specifically, at step 206, if controller 150 receives signals indicating a low steering wheel angle and velocity and a high vehicle speed, controller 150 operates hydraulic pump 120 at a low speed. At step 208, if controller 150 receives signals indicating a high steering wheel angle and velocity and a low vehicle speed, controller 150 operates hydraulic pump 120 at a high speed. At step 210, if controller receives a request for a hydraulic assist maneuver (e.g., self-parking, parking assist), controller 150 operates hydraulic pump 120 at a high speed. Control then returns to step 202 to determine if the speed of hydraulic pump 120 should be adjusted again.

Described herein are systems and methods providing electronic hydraulic power steering to a steering gear. An electronic hydraulic power steering system includes a hydraulic power steering assembly fluidly coupled to an electrically powered hydraulic pump having an electric motor. The electrically powered hydraulic pump enables control of fluid flow and supply pressure independent of vehicle engine speed. As such, the hydraulic fluid pressure and/or supply flow may be selectively adjusted for a desired operation of the system, and use of an electric pump reduces vehicle fuel and power consumption.

By utilizing an electric driven pump along with a torque overlay system, park-assist can be achieved without the added cost and packaging space of a larger actuator. This allows the actuator to be sized for the highway functions such as leads and pulls correction, etc., which do not require full actuation of the valve. For parking maneuvers, the electric driven pump can increase the flow rate to not only eliminate the traditional reduction of flow rate at idle, but also increase it beyond the highway level. In this way, the parking efforts can be further reduced, and thereby be able to be fully actuated with the smaller torque overlay actuator.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A power steering assist system comprising:
   a hydraulic assist power steering assembly configured to couple to a vehicle steering gear, comprising:
   a housing,
   a rotary valve assembly,
   a differential pressure transducer, and
   a rotatable magnetic actuator assembly, the magnetic actuator assembly configured to provide an assist torque to a coupler configured for coupling to the vehicle steering gear; and
   an electrically powered hydraulic pump, the hydraulic pump configured to supply pressurized hydraulic fluid to the hydraulic assist power steering assembly.

2. The system of claim 1, wherein the rotary valve assembly is a hydraulic rotary valve assembly.

3. The system of claim 1, further comprising an input shaft disposed at least partially within the housing, the input shaft having a bore, a first end configured to couple to a vehicle steering wheel, and a second end configured to couple to the steering gear, wherein a torsion bar is disposed within the input shaft bore.

4. The system of claim 1, further comprising an electrical power source electrically coupled to the hydraulic pump, the electrical power source configured to power the electrically powered hydraulic pump.

5. The system of claim 4, wherein the electrical power source is a vehicle battery.

6. The system of claim 1, further comprising a controller in signal communication with the hydraulic assist power steering assembly and the electric hydraulic pump, the controller programmed to selectively operate the hydraulic pump between a low speed and a high speed.

7. The system of claim 6, further comprising a steering wheel angle and velocity sensor in signal communication with the controller, the steering wheel angle sensor configured to determine an angle and velocity of a vehicle steering wheel, wherein the controller is programmed to selectively operate the hydraulic pump between the low speed and the high speed based on the determined angle and velocity of the steering wheel.

8. The system of claim 6, further comprising a vehicle speed sensor in signal communication with the controller, the vehicle speed sensor configured to determine a speed of a vehicle, wherein the controller is programmed to selectively operate the hydraulic pump between the low speed and the high speed based on the determined vehicle speed.

9. A vehicle comprising:
   a steering gear operably coupled to at least one road wheel; and
   a hydraulic assist power steering system comprising:
   a hydraulic assist power steering assembly coupled to the steering gear comprising:
   a housing,
   a rotary valve assembly,
   a differential pressure transducer, and
   a rotatable magnetic actuator assembly, the magnetic actuator assembly configured to provide an assist torque to a coupler coupled to the vehicle steering gear; and
   an electrically powered hydraulic pump, the hydraulic pump configured to supply pressurized hydraulic fluid to the hydraulic assist power steering assembly.

10. The vehicle of claim 9, wherein the rotary valve assembly is a hydraulic rotary valve assembly.

11. The vehicle of claim 9, wherein the hydraulic assist power steering assembly further comprises an input shaft disposed at least partially within the housing, the input shaft having a bore, a first end configured to couple to a vehicle steering wheel, and a second end configured to couple to the steering gear, wherein a torsion bar is disposed within the input shaft bore.

12. The vehicle of claim 9, further comprising an electrical power source electrically coupled to the hydraulic pump, the electrical power source configured to power the electrically powered hydraulic pump.

13. The vehicle of claim 9, further comprising a controller in signal communication with the hydraulic assist power steering assembly and the electric hydraulic pump, the controller programmed to selectively operate the hydraulic pump between a low speed and a high speed.

14. The vehicle of claim 13, further comprising a steering wheel angle and velocity sensor in signal communication with the controller, the steering wheel angle sensor configured to determine an angle and velocity of a vehicle steering wheel, wherein the controller is programmed to selectively operate the hydraulic pump between the low speed and the high speed based on the determined angle and velocity of the steering wheel.

15. The vehicle of claim 13, further comprising a vehicle speed sensor in signal communication with the controller, the vehicle speed sensor configured to determine a speed of a vehicle, wherein the controller is programmed to selectively operate the hydraulic pump between the low speed and the high speed based on the determined vehicle speed.

16. A method of operating a hydraulic assist power steering system comprising: a hydraulic assist power steering assembly configured to couple to a vehicle steering gear, comprising: a housing, a rotary valve assembly, a differential pressure transducer, and a rotatable magnetic actuator assembly, the magnetic actuator assembly configured to provide an assist torque to a coupler configured for coupling to the vehicle steering gear; and an electrically powered hydraulic pump, the hydraulic pump configured to supply pressurized hydraulic fluid to the hydraulic assist power steering assembly, the method comprising:

monitoring a vehicle to determine if a condition exists where a hydraulic assist maneuver may be performed;

operating the electrically powered hydraulic pump at a low speed if the condition does not exist where the hydraulic assist maneuver may be performed, to supply pressurized hydraulic fluid to the hydraulic assist power steering assembly at a low flow rate; and operating the electrically powered hydraulic pump at a high speed if the condition exists where the hydraulic assist maneuver may be performed, to supply the pressurized hydraulic fluid to the hydraulic assist power steering assembly at a high flow rate.

\* \* \* \* \*